US012665459B2

(12) United States Patent
Zhang et al.

(10) Patent No.: US 12,665,459 B2
(45) Date of Patent: Jun. 23, 2026

(54) MOTOR STATOR AND MOTOR USING THE SAME

(71) Applicants:ZHEJIANG ZEEKR INTELLIGENT TECHNOLOGY CO., LTD., Ningbo (CN); VIRIDI E-MOBILITY TECHNOLOGY (NINGBO) CO., LTD., Ningbo (CN); ZHEJIANG GEELY HOLDING GROUP CO., LTD., Hangzhou (CN)

(72) Inventors: Zengjie Zhang, Ningbo (CN); Ou Ruan, Ningbo (CN); Xindong Sun, Ningbo (CN); Dianye Zhu, Ningbo (CN); Tao Li, Ningbo (CN); Hao Tang, Ningbo (CN); Hongkai Zhang, Ningbo (CN); Xiandong Zhang, Ningbo (CN); Ruyu Lin, Ningbo (CN)

(73) Assignees: ZHEJIANG ZEEKR INTELLIGENT TECHNOLOGY CO., LTD., Ningbo (CN); VIRIDI E-MOBILITY TECHNOLOGY (NINGBO) CO., LTD., Ningbo (CN); ZHEJIANG GEELY HOLDING GROUP CO., LTD., Hangzhou (CN)

( * ) Notice: Subject to any disclaimer, the term of this patent is extended or adjusted under 35 U.S.C. 154(b) by 263 days.

(21) Appl. No.: 18/676,371

(22) Filed: May 28, 2024

(65) Prior Publication Data

US 2024/0333059 A1     Oct. 3, 2024

Related U.S. Application Data

(63) Continuation of application No. PCT/CN2023/079299, filed on Mar. 2, 2023.

(30) Foreign Application Priority Data

Mar. 29, 2022   (CN) .......................... 202210318610.0

(51) Int. Cl.
*H02K 3/28* (2006.01)
*H02K 1/16* (2006.01)

(52) U.S. Cl.
CPC ................. *H02K 3/28* (2013.01); *H02K 1/16* (2013.01)

(58) Field of Classification Search
CPC .............. H02K 3/28; H02K 1/16; H02K 3/12; H02K 15/064; H02K 2213/03
(Continued)

(56) References Cited

U.S. PATENT DOCUMENTS

| 5,898,251 | A | 4/1999 | Mochizuki et al. |
| 6,201,332 | B1 | 3/2001 | Umeda et al. |

(Continued)

FOREIGN PATENT DOCUMENTS

| CN | 208078742 U | 11/2018 |
| CN | 109586444 A | 4/2019 |

(Continued)

OTHER PUBLICATIONS

Extended European Search Report in related European Application No. 23777745.3 dated Oct. 10, 2025 (8 pages).
International Search Report issued in corresponding International Application No. PCT/CN2023/079299, mailed on Apr. 23, 2023, 9 pages.

*Primary Examiner* — Alexander A Singh
(74) *Attorney, Agent, or Firm* — Bayes PLLC

(57) ABSTRACT

A motor stator includes a stator core having stator slots, and a stator winding inserted into the stator slots. Each stator slot includes slot layers. The stator winding includes first and second conductors each including two straight segment parts. The straight segment parts of the first conductors are separately located at two adjacent slot layers. One straight segment part of the second conductor and one straight segment part of the first conductor are located in a same stator slot. A pole pitch of the stator winding is τ, a size of (Continued)

a pitch of the second conductor is y2, a distance between straight segment parts of two adjacent first conductors at a same slot layer is L1, a distance between straight segment ends of adjacent second conductors at a same slot layer is L2, and the followings are met: L1=$\tau$+1 or L1=$\tau$−1, and L2=2$\tau$−y2.

20 Claims, 8 Drawing Sheets

(58) Field of Classification Search
USPC .................................................. 310/179, 198
See application file for complete search history.

(56) References Cited

U.S. PATENT DOCUMENTS

| | | | | |
|---|---|---|---|---|
| 6,459,186 | B1 | 10/2002 | Umeda et al. | |
| 2003/0122441 | A1* | 7/2003 | Masegi | H02K 15/24 |
| | | | | 310/208 |
| 2003/0230949 | A1 | 12/2003 | Ogawa et al. | |
| 2006/0033394 | A1 | 2/2006 | Ogawa et al. | |
| 2012/0228989 | A1* | 9/2012 | Okimitsu | H02K 3/12 |
| | | | | 310/260 |
| 2018/0097431 | A1 | 4/2018 | Laldin et al. | |
| 2020/0235622 | A1 | 7/2020 | Tian et al. | |

FOREIGN PATENT DOCUMENTS

| | | | |
|---|---|---|---|
| CN | 109586458 | A | 4/2019 |
| CN | 110556952 | A | 12/2019 |
| CN | 111463944 | A | 7/2020 |
| CN | 111478487 | A | 7/2020 |
| CN | 111884382 | A | 11/2020 |
| CN | 112436617 | A | 3/2021 |
| CN | 214124957 | U | 9/2021 |
| CN | 113726040 | A | 11/2021 |
| CN | 113783334 | A | 12/2021 |
| CN | 113794302 | A | 12/2021 |
| CN | 113839502 | A | 12/2021 |
| CN | 114157059 | A | 3/2022 |
| CN | 114552811 | A | 5/2022 |
| KR | 101843692 | B1 | 3/2018 |

* cited by examiner

Hairpin end

Welding end

MOTOR STATOR AND MOTOR USING THE SAME

CROSS-REFERENCE TO RELATED APPLICATIONS

This application is a continuation of International Application No. PCT/CN2023/079299, filed on Mar. 2, 2023, which claims the benefit of priority to Chinese Application No. 202210318610.0, filed on Mar. 29, 2022, both of which are hereby incorporated by reference in their entireties.

TECHNICAL FIELD

The present disclosure relates to the field of motor technologies, and in particular, to a motor stator and a motor using the same.

BACKGROUND

A flat wire (rectangular wire) manner is used for winding a stator core. This can significantly increase a bare copper slot fill factor of the stator coil, thereby greatly improving motor efficiency. The stator winding includes a plurality of hairpin coils. The plurality of hairpin coils are inserted into stator slots of the stator core in a specific arrangement manner, to form a required winding of a single-phase motor or a multi-phase motor.

However, there are various types of existing stator hairpin coils that are arranged in a complex manner. Because a voltage difference between different slot layers in a same stator slot is high, hairpin coils at different slot layers are prone to breakdown during running at a high voltage. As a result, a short circuit would be caused such that a motor would fail.

SUMMARY

The present disclosure provides a motor stator, including a stator core, having stator slots, the stator slot including several slot layers, and the slot layers being disposed along a radial direction of the stator core; and a stator winding, inserted into the stator slot. The stator winding includes a plurality of first conductors and a plurality of second conductors, and the first conductors and the second conductors each includes two straight segment parts. Straight segment parts of the plurality of first conductors are separately located at two adjacent slot layers, both a first conductor and a second conductor include two straight segment parts, and one straight segment part of the second conductor and one straight segment part of the first conductor are located in a same stator slot. A pole pitch of the stator winding is $\tau$, a size of a pitch of the second conductor is y2, a distance between two adjacent first conductors at a same slot layer is L1, a distance between adjacent second conductors is L2, and the followings are met: $L1=\tau+1$ or $L1=\tau-1$, and $L2=2\tau-y2$.

In an embodiment of the present disclosure, the stator winding further includes third conductors, located between the first conductors and the second conductors. Straight segment parts of a third conductor and the two straight segment parts of a first conductor are separately located in a same stator slot, a size of a pitch of the third conductor is y3, and the following is met: y3=y1.

In an embodiment of the present disclosure, the third conductors in the stator slots occupy at least two slot layers.

In an embodiment of the present disclosure, the stator winding includes at least one phase winding.

In an embodiment of the present disclosure, each phase winding includes at least two branch windings, and the branch windings are connected in series or in parallel.

In an embodiment of the present disclosure, each phase winding includes two branch windings, and straight segment parts of the second conductors in the two branch windings are located in adjacent stator slots.

In an embodiment of the present disclosure, straight segment parts of the first conductors in the two branch windings are located in adjacent stator slots.

In an embodiment of the present disclosure, the first conductor further includes a head, the head being connected between one ends of the two straight segment parts of the first conductor; and a bending part, the other ends of the two straight segment parts of the first conductor being separately connected to the bending part.

In an embodiment of the present disclosure, extension directions of bending parts of the first conductors located between adjacent second conductors are opposite, and extension directions of bending parts of the first conductors located outside the second conductor are the same.

The present disclosure further provides a motor, including a motor body; and a motor stator, mounted on the motor body. The motor stator includes a stator core, having stator slots, the stator slot including several slot layers, and the slot layers being disposed along a radial direction of the stator core; and a stator winding, inserted into the stator slot. The stator winding includes a plurality of first conductors and a plurality of second conductors. The first conductors and the second conductors each includes two straight segment parts. Straight segment parts of the plurality of first conductors are separately located at two adjacent slot layers, both a first conductor and a second conductor include two straight segment parts, and one straight segment part of the second conductor and one straight segment part of the first conductor are located in a same stator slot. A pole pitch of the stator winding is $\tau$, a size of a pitch of the second conductor is y2, a distance between two adjacent first conductors at a same slot layer is L1, a distance between adjacent second conductors is L2, and the followings are met: $L1=\tau+1$ or $L1=\tau-1$, and $L2=2\tau-y2$.

In the figures: 100. motor stator; 200. welding end; 300. stator core; 400. hairpin end; 500. stator winding; 501. head; 502. straight segment part; 503. bending part; 510. first conductor; 511. first-type conductor; 512. second-type conductor; 520. second conductor; 530. third conductor; 600. motor body.

DETAILED DESCRIPTION

The following describes implementations of the present disclosure by using some specific examples. A person skilled in the art can easily understand other advantages and effects of the present disclosure based on the content disclosed in this specification. The present disclosure may be further implemented or applied by using other different specific implementations. Various details in this specification may also be modified or altered based on different viewpoints and applications without departing from the present disclosure.

It should be noted that the drawings provided in the embodiments merely describe the basic concept of the present disclosure by using examples. Although the drawings show only components related to the present disclosure, and are not drawn based on a quantity, a shape and a size of a component during actual implementation, a shape, a quantity, and a scale of the components may be arbitrarily changed during actual implementation, and a component layout form may be more complex.

The present disclosure provides a motor stator and a motor to which the motor stator is applied, to resolve a problem that because a voltage difference between different slot layers is high, hairpin coils are prone to breakdown during running at a high voltage.

The present disclosure provides a motor stator and a motor to which the motor stator is applied, to resolve a problem that hairpin coils are prone to breakdown due to a high voltage difference between different layers in a same stator slot. In this way, a wire entry end and a wire exit end of each branch winding can be disposed on a same side of the stator winding, so that a height of a welding end can be fully used. In addition, the problem of allocating a quantity of conductors connected in series per phase is resolved, so that a motor with a specific power and torque requirement can be designed.

The present disclosure provides a motor stator and a motor to which the motor stator is applied, and may be applied to the electrical servo transmission field, the transportation field, and the like. For example, the motor stator and the motor to which the motor stator is applied in the present disclosure may be applied to an electric vehicle. In the present disclosure, a problem that a short circuit is caused because hairpin coils at different slot layers are prone to breakdown, so that motor efficiency can be improved. The following describes the present disclosure in detail by using a specific embodiment.

Figure 1:
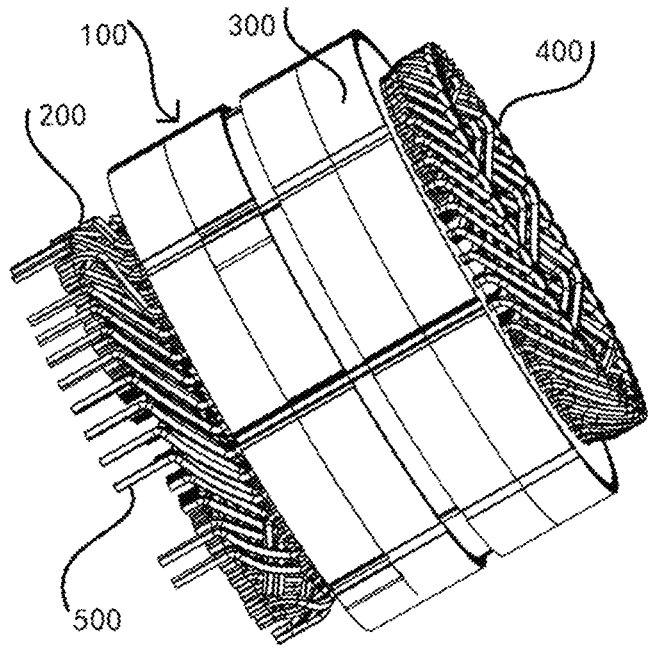
FIG. 1 is a schematic diagram of a structure of a motor stator according to the present disclosure.
Figure 2:
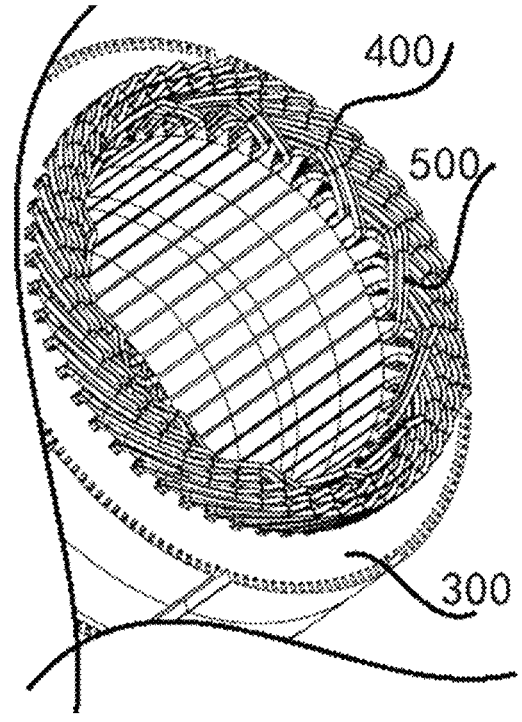
FIG. 2 is a schematic diagram of a structure of a hairpin end of a motor stator according to the present disclosure.
Figure 3:
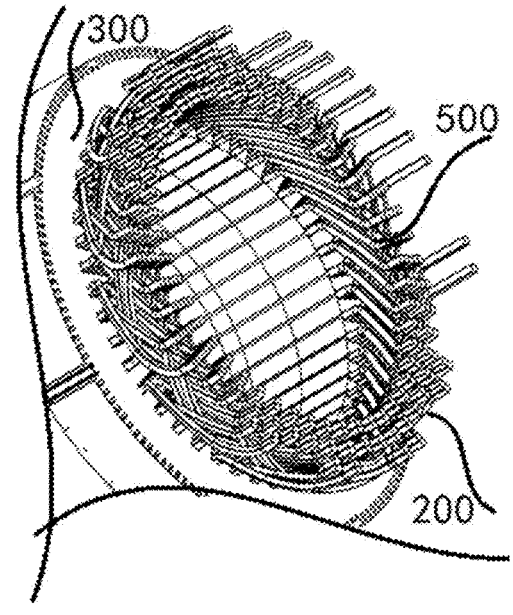
FIG. 3 is a schematic diagram of a structure of a welding end of a motor stator according to the present disclosure.
Figure 11:
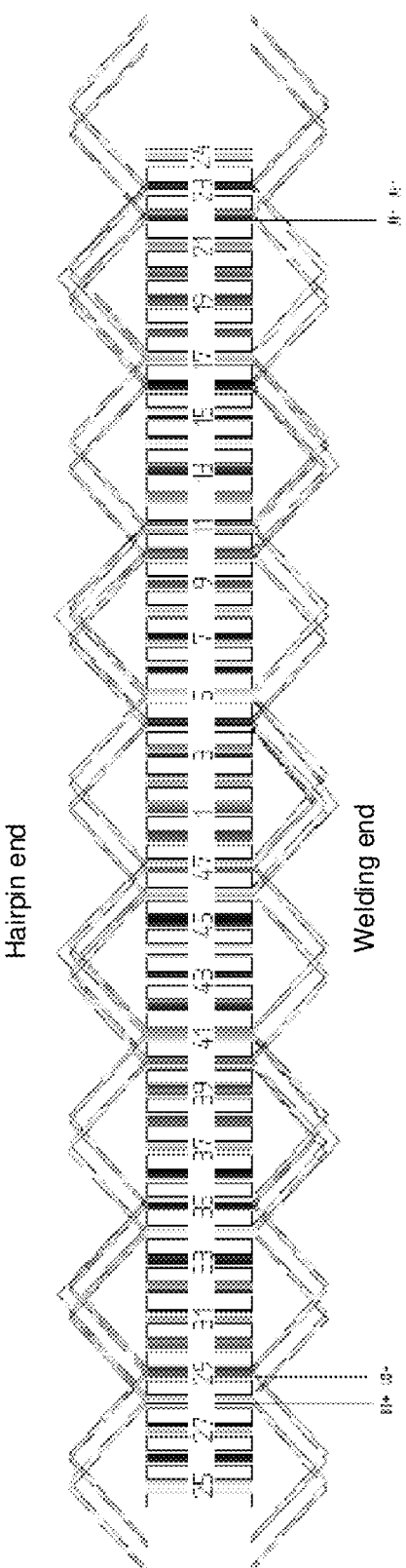
FIG. 11 is a wiring diagram of a stator winding in a motor stator according to the present disclosure.
Figure 12:
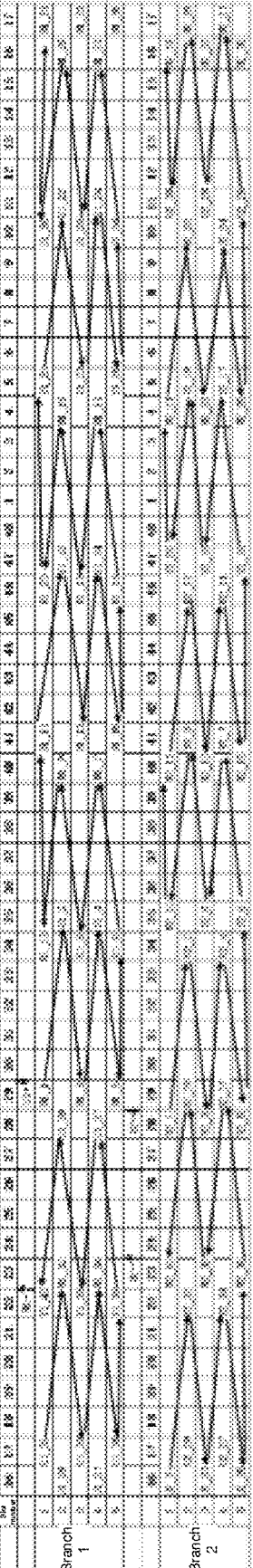
FIG. 12 is a schematic diagram of wire winding of a stator winding in a motor stator according to the present disclosure.
Figure 13:
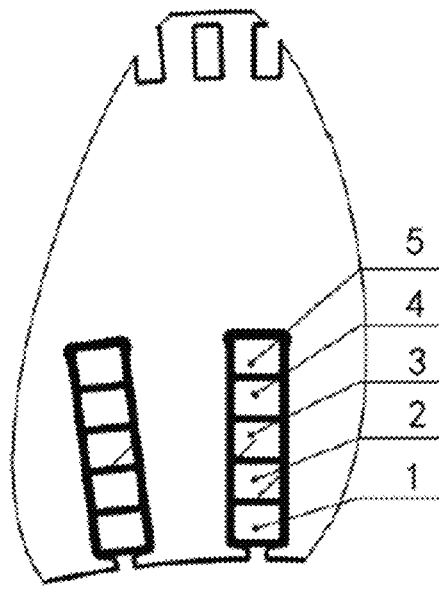
FIG. 13 is a schematic diagram of a stator slot in a motor stator according to the present disclosure.

Referring to FIG. 1 to FIG. 3, the present disclosure provides a motor stator. In some embodiments, the motor stator 100 may include a stator core 300 and a stator winding 500. The stator core 300 may be provided with a plurality of stator slots, and the stator slots may be formed in an inner surface of the stator core 300. The stator slots may be arranged along a circumferential direction of the stator core 300, and the stator slots may be spaced apart on the stator core 300 by a predetermined slot pitch. As shown in FIG. 11 and FIG. 12, the plurality of stator slots may be, respectively, a stator slot 1, a stator slot 2, a stator slot 3, a stator slot 4, and . . . along the circumferential direction of the stator core 300. For example, 48 stator slots may be arranged along the circumferential direction of the stator core 300. As shown in FIG. 13, a plurality of slot layers may be disposed in each stator slot. In some embodiments, an odd quantity of slot layers may be disposed in each stator slot. For example, five slot layers may be disposed in each stator slot. For example, the five slot layers along a radial direction of the stator core 300 from an inner side to an outer side may be respectively a slot layer 1, a slot layer 2, a slot layer 3, a slot layer 4, and a slot layer 5, that is, the slot layer 1 is located on a side close to the inside of the stator slot, and the slot layer 5 is located on a side close to the outside of the stator slot. In addition, specific numbers of slot layers of each stator slot are not limited, and the slot layers may be disposed from the inner side to the outer side in an order of 1 to 5, or may be disposed from the outer side to the inner side in an order of 1 to 5.

Referring to FIG. 4, FIG. 7, FIG. 8, FIG. 6, and FIG. 10, in some embodiments, the stator winding 500 may be inserted into the stator slots, and the stator winding 500 may include a plurality of first conductors 510 and a plurality of second conductors 520. The plurality of first conductors 510 may form a first coil group, and the first coil group may be located in corresponding stator slots of the stator core 300. The plurality of second conductors 520 may form a second coil group, and the second coil group may be located in corresponding stator slots of the stator core 300. The second coil group may be located on a side close to the inside of the stator slot.

Figure 4:
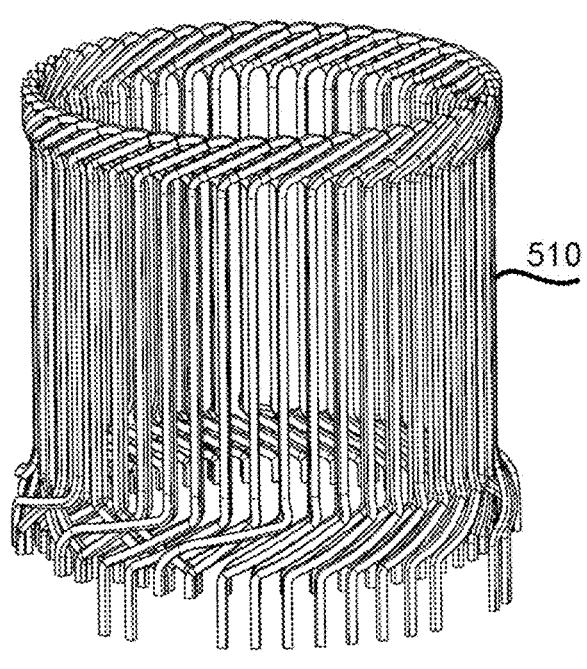
FIG. 4 is a schematic diagram of a structure of a first coil group formed by first conductors in a motor stator according to the present disclosure.
Figure 5:
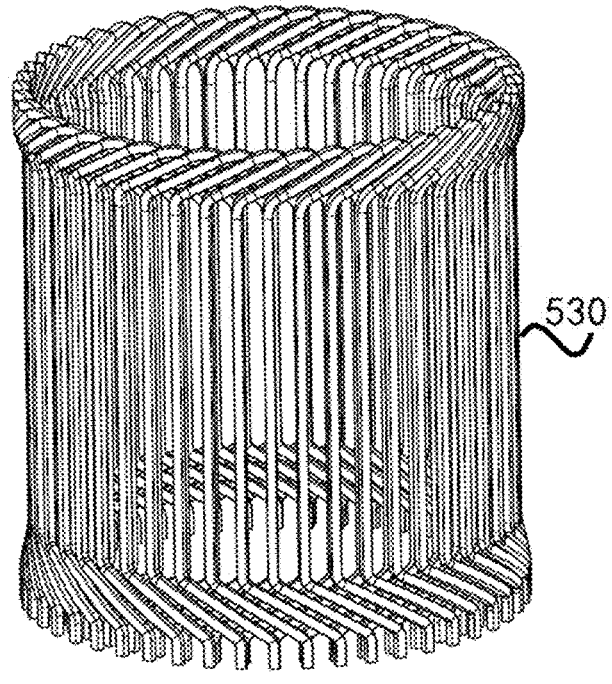
FIG. 5 is a schematic diagram of a structure of a third coil group formed by third conductors in a motor stator according to the present disclosure.
Figure 7:
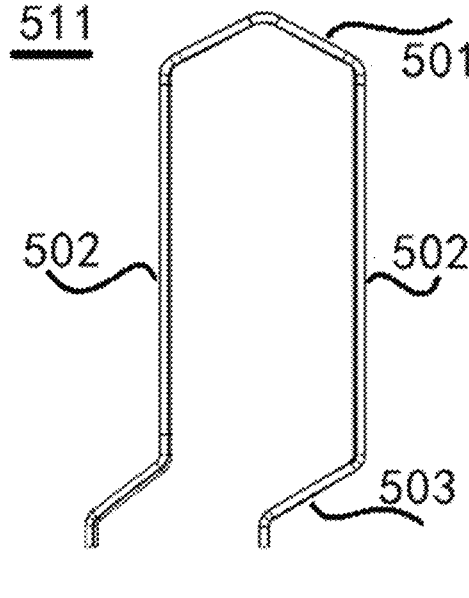
FIG. 7 is a schematic diagram of a structure of a first-type conductor among first conductors of a motor stator according to the present disclosure.
Figure 8:
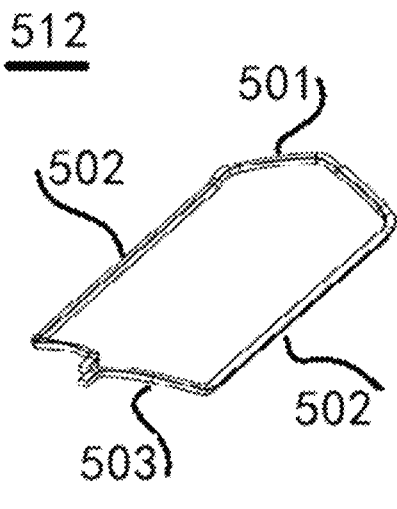
FIG. 8 is a schematic diagram of a structure of a second-type conductor among first conductors of a motor stator according to the present disclosure.
Figure 9:
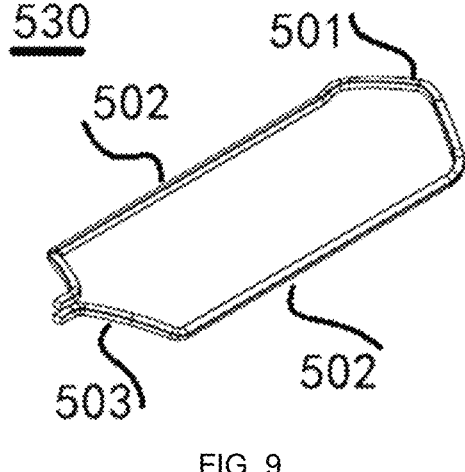
FIG. 9 is a schematic diagram of a structure of a third conductor in a motor stator according to the present disclosure.

Referring to FIG. 4, FIG. 7, and FIG. 8, in some embodiments, a first conductor 510 may include a head 501, straight segment parts 502, and a bending part 503. The straight segment parts 502 may be configured to be inserted into the stator slot, and two straight segment parts 502 of the first conductor 510 may be configured to be inserted into different stator slots. The head 501 may be connected between one ends of the two straight segment parts 502. The other ends of the two straight segment parts 502 may be connected to the bending part 503.

Figure 6:
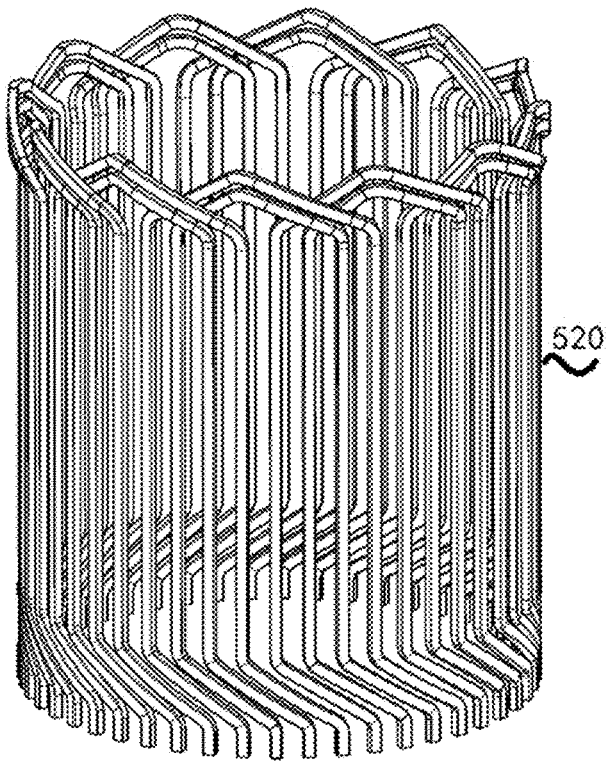
FIG. 6 is a schematic diagram of a structure of a second coil group formed by second conductors in a motor stator according to the present disclosure.
Figure 10:
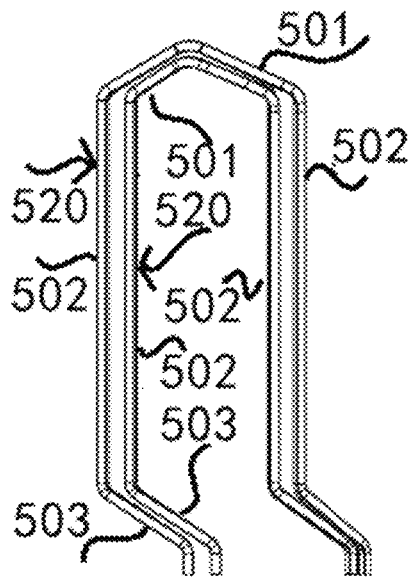
FIG. 10 is a schematic diagram of a structure of a second conductor in a motor stator according to the present disclosure.

Referring to FIG. 6 and FIG. 10, in some embodiments, a structure of a second conductor 520 may be similar to a structure of the first conductor 510. The second conductor 520 may include a head 501, straight segment parts 502, and a bending part 503. The straight segment parts 502 may be configured to be inserted into corresponding stator slots, and two straight segment parts 502 of the second conductor 520 may be configured to be inserted into different stator slots. The head 501 may be connected between one ends of the two straight segment parts 502. The other ends of the two straight segment parts 502 may be connected to the bending part 503.

The following describes the first conductor 510 and the second conductor 520 in detail by using specific embodiments.

Referring to FIG. 4, FIG. 7, and FIG. 8, in some embodiments, the first conductors 510 may include first-type conductors 511 and second-type conductors 512. A first-type conductor 511 may include a head 501, straight segment parts 502, and bending parts 503. The straight segment parts 502 may be configured to be inserted into corresponding stator slots, and two straight segment parts 502 of the first-type conductor 511 may be configured to be inserted into different stator slots. The head 501 may be connected between one ends of the two straight segment parts 502. The other ends of the two straight segment parts 502 may be connected to the bending parts 503.

A second-type conductor 512 may include a head 501, straight segment parts 502, and bending parts 503. The straight segment parts 502 may be configured to be inserted into corresponding stator slots, and two straight segment parts 502 of the second-type conductor 512 may be configured to be inserted into different stator slots. The head 501 may be connected between one ends of the two straight segment parts 502. The other ends of the two straight segment parts 502 may be connected to the bending parts 503. A difference between the first-type conductor 511 and the second-type conductor 512 lies in that two bending parts 503 of the first-type conductor 511 have a same extension direction and face in a same direction; and two bending parts of the second-type conductor 512 have opposite extension directions and face in opposite directions.

Referring to FIG. 6 and FIG. 10, in some embodiments, the second conductors 520 may be configured to have two parts. Pitches of one part of second conductors 520 may be greater than a pole pitch of the stator winding 500, pitches of the other part of second conductors 520 may be less than the pole pitch of the stator winding 500, and a sum of the pitches of the two parts of second conductors 520 may be twice a size of the pole pitch of the stator winding 500. For example, the pole pitch of the stator winding 500 has a size of six slot pitches, the pitches of one part of second conductors 520 may have a size of five slot pitches, and the pitches of the other part of second conductors 520 may have a size of seven slot pitches.

Referring to FIG. 11 and FIG. 12, in some embodiments, straight segment parts 502 of the plurality of first conductors 510 may be separately located at two adjacent slot layers. The straight segment part 502 of the second conductor 520 and the straight segment part 502 of the first conductor 510 may be located in a same stator slot. A size of a pitch of the first conductor 510 may be the same as a size of the pole pitch of the stator winding 500. In some embodiments, compared with the pole pitch of the stator winding 500, a distance between straight segment parts 502 of adjacent first conductors 510 at a same slot layer may differ by one slot pitch, and a distance between straight segment parts 502 of two adjacent second conductors 520 may be the same. For example, the pole pitch of the stator winding is τ, the size of the pitch of the second conductor is y2, at a same slot layer, the distance between straight segment parts of two adjacent first conductors is L1, the distance between straight segment parts 502 of adjacent second conductors is L2, and the followings are met: L1=τ+1 or L1=τ−1, and L2-2τ−y2.

Referring to FIG. 1 to FIG. 3, FIG. 11, and FIG. 12, in some embodiments, a quantity of stator slots of the stator core 300 may be, for example, 48. The stator windings 500 may include a plurality of phase windings, and the plurality of phase windings are different from each other in terms of electrical phase. For example, the stator winding 500 may include three phase windings. Each phase winding may include two branch windings, and the two branch windings may be connected in series or parallel. Each branch winding may include eight magnetic poles. The pole pitch of the stator winding may have a size of six slot pitches. A quantity of slots per phase per pole is 2, q=z/2pm, q is a quantity of slots per phase per pole, z is a quantity of stator slots, 2p is a quantity of poles of the motor, and m is a quantity of phases of the motor.

Referring to FIG. 1 to FIG. 3, FIG. 11, and FIG. 12, the size of the pitch of the first conductor 510 may be the same as the size of the pole pitch of the stator winding 500, and may be six slot pitches. The distance between straight segment parts 502 of adjacent first conductors 510 at a same slot layer may be five slot pitches or seven slot pitches. In some embodiments, the size of the pitch of the second conductor 520 may have a size of seven slot pitches, the distance between straight segment parts 502 of two adjacent second conductors 520 may be five slot pitches, and the second conductors 520 with a pitch of seven slot pitches may be arranged along the circumferential direction of the stator core 300. In some other embodiments, the size of the pitch of the second conductor 520 may have a size of five slot pitches, the distance between straight segment parts 502 of two adjacent second conductors 520 may be seven slot pitches, and the second conductors 520 with a pitch of five slot pitches are arranged along the circumferential direction of the stator core 300.

In this case, the first conductor 510 and the second conductor 520 are not filled in a same stator slot, and the first conductor 510 and the second conductor 520 are filled in adjacent stator slots, to resolve a problem that hairpin coils are prone to breakdown due to a high voltage difference between different layers in a same stator slot.

An end that is of the stator winding 500 and that is located on the head 501 of the first conductor 510 and the head 501 of the second conductor 520 is a hairpin end 400. An end that is of the stator winding 500 and that is located on the bending part 503 of the first conductor 510 and the bending part 503 of the second conductor 520 may be a welding end 200.

Referring to FIG. 1 to FIG. 3, FIG. 11, and FIG. 12, in some embodiments, each phase winding may include two branch windings, a size of pitches of one part of second conductors 520 may be seven slot pitches, and a size of pitches of the other part of second conductors 520 may be five slot pitches. A second conductor 520 with a pitch of five slot pitches in one branch winding and a second conductor 520 with a pitch of seven slot pitches in the other branch winding may be located in adjacent stator slots. That is, when one straight segment part 502 of the second conductor 520 in the first branch winding and one straight segment part 502 of the second conductor 520 in the second branch winding are located in adjacent stator slots, the other straight segment part 502 of the second conductor 520 in the first branch winding and the other straight segment part 502 of the second conductor 520 in the second branch winding are located in adjacent stator slots, that is, the second conductor 520 with a pitch of seven slot pitches surrounds the second conductor 520 with a pitch of five slot pitches.

As shown in FIG. 11 and FIG. 12, when a wire entry end of the first branch winding may be located at a slot layer 1 of a stator slot 29, a wire exit end of the branch winding may be located at a slot layer 1 of a stator slot 22; and when a wire entry end of the second branch winding may be located at a slot layer 1 of a stator slot 28, a wire exit end of the second branch winding may be located on a slot layer 1 of a stator slot 23. When the wire entry end of the first branch winding may be located at the slot layer 1 of the stator slot 29, the wire entry end of the second branch winding may be located at the slot layer 1 of the stator slot 28. Wire winding is performed in this wire winding manner, so that a wire winding structure of each phase winding of the stator winding 500 can be optimized. In this wire winding manner, a wire entry end and a wire exit end of each branch winding can be disposed on a same side of the stator winding 500, so that a height of the welding end 200 can be fully used.

Wire entry ends of the two branch windings are located in adjacent stator slots, so that the wire entry ends of the two branch windings can be conveniently welded. Similarly, wire exit ends of the two branch windings are located in adjacent stator slots to facilitate welding therebetween. In this case, the two branch windings are connected in parallel. In some embodiments, the two branch windings may alternatively be connected in series. For example, a wire exit end of one branch winding may be connected to a wire entry end of the other branch winding by using a wire. The two branch windings are connected to form one phase winding, so that a quantity of turns can be adjusted, and an unbalanced current is not easily generated. Therefore, a circulating current can be avoided, and the motor can be prevented from failing.

The second conductors 520 form a second coil group. In the second coil group, a second conductor 520 with a pitch of seven slot pitches may be located on the outside of a second conductor 520 with a pitch of five slot pitches, that is, the second conductor 520 with a pitch of seven slot pitches surrounds the second conductor 520 with a pitch of five slot pitches. The first conductors 510 form a first coil group, and the first conductors 510 in the first coil group are in a non-coplanar relationship. In the present disclosure, a problem that a plurality of coils of the stator winding are nested is resolved, a height of the bending parts of the stator coil can be reduced, motor efficiency can be improved, a torque density and a power density of the motor are improved, a circulating current of the stator winding can be avoided, a loss is reduced, and problems of insulation damage and high-voltage breakdown caused by nesting the coils in a production process can be reduced. In addition, an odd quantity of layers of windings are used to resolve a problem of allocating a quantity of conductors connected in series per phase, so that a motor with a specific power and torque requirement can be designed.

Referring to FIG. 1 to FIG. 3, FIG. 5, and FIG. 9, in some embodiments, the motor stator may include third conductors 530. In some embodiments, a third conductor 530 may include a head 501, straight segment parts 502, and bending parts 503. The straight segment parts 502 may be configured to be inserted into corresponding stator slots, and two straight segment parts 502 of the third conductor 530 may be configured to be inserted into different stator slots. The head 501 may be connected between one ends of the two straight segment parts 502. The other ends of the two straight segment parts 502 may be connected to the bending parts 503. The third conductors 530 may form a third coil group, and the third coil group may be located between the first coil group and the second coil group, wherein there is at least one third coil group.

Referring to FIG. 1 to FIG. 3, FIG. 5, FIG. 9, FIG. 11, and FIG. 12, in some embodiments, the straight segment parts 502 of the third conductor 530 may be separately located at two adjacent slot layers. A size of a pitch of the third conductor 530 may be the same as the size of the pitch of the first conductor 510. The third conductor 530 and the first conductor 510 may be in a parallel relationship. The pitch of the third conductor is y3, and y3=y1 is met.

Referring to FIG. 4 to FIG. 10, in some embodiments, extension directions of bending parts 503 of the second conductors 520 are the same, and the second conductors 520 form a second coil group. The extension directions of the bending parts 503 of the second conductors 520 in the second coil group are the same, and may be a clockwise direction or a counterclockwise direction. Extension directions of bending parts 503 of the third conductors 530 are opposite, and the third conductors 530 form a third coil group. An extension direction of one bending part 503 of a third conductor 530 in the third coil group may be a clockwise direction or a counterclockwise direction, and is opposite to an extension direction of the other bending part 503 of the third conductor 530. The first conductors 510 may form a first coil group, wherein extension directions of bending parts 503 of one part of first conductors 510 are the same, while extension directions of bending parts 503 of the other part of first conductors 510 are opposite. For example, extension directions of bending parts 503 of first conductors 510 located between adjacent second conductors 520 may be opposite. One bending parts 503 of the part of first conductors 510 may extend clockwise or counterclockwise on the first coil group, while extension directions of the other bending parts 503 of the first conductors 510 are opposite thereto. Extension directions of bending parts 503 of first conductors 510 located outside the second conductor 520 may be the same, and the bending parts 503 of the part of first conductors 510 may extend in a counterclockwise or clockwise direction on the first coil group. The extension direction of the bending part 503 of the first conductor 510, the extension direction of the bending part 503 of the second conductor 520, and the extension direction of the bending part 503 of the third conductor 530 are not specifically limited, and should meet a wiring diagram shown in FIG. 12.

Figure 14:
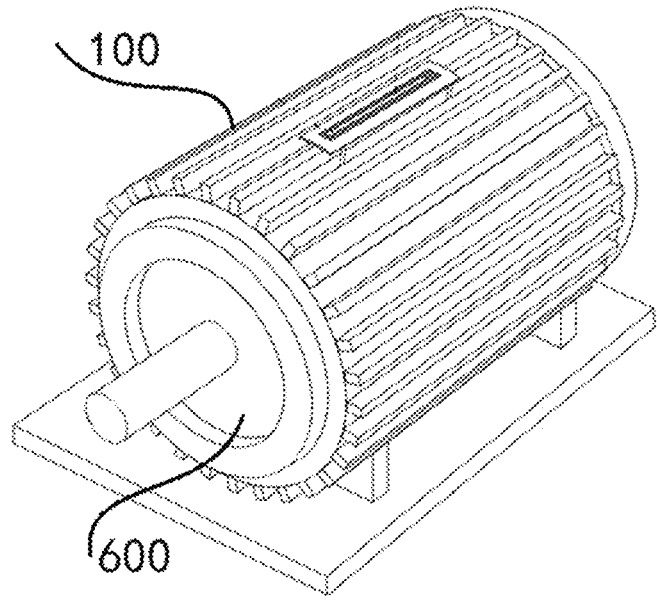
FIG. 14 is a schematic diagram of a structure of a motor according to the present disclosure.

Referring to FIG. 14, in some embodiments, the present disclosure further provides a motor, including a motor stator 100 and a motor body 600. The motor stator 100 is mounted on the motor body 600. The motor stator 100 includes a stator core 300 and a stator winding 500. The stator core 300 may have stator slots. A stator slot may include several slot layers, and the slot layers may be disposed along a radial direction of the stator core 300. The stator winding 500 may be inserted into the stator slots, the stator winding 500 may include a plurality of first conductors 510 and a plurality of second conductors 520, and the first conductors 510 and the second conductors 520 each may include two straight segment parts. The plurality of first conductors 510 may be separately located at two adjacent slot layers. A straight segment part of the second conductor 520 and a straight segment part of the first conductor 510 may be located in a same stator slot. A size of a pitch of the first conductor 510 is the same as a size of a pole pitch of the stator winding 500. The distance between straight segment parts 502 of two adjacent first conductors 510 at a same slot layer may differ by one slot pitch compared with the pole pitch of the stator winding 500. The distance between straight segment parts 502 of two adjacent second conductors 520 may be equal.

In conclusion, the present disclosure provides a motor stator and a motor to which the motor stator is applied, so that conductors in one branch winding are not filled in a same stator slot, to resolve a problem that hairpin coils are prone to breakdown due to a high voltage difference between different layers in a same stator slot. In this way, a wire entry end and a wire exit end of each branch winding can be disposed on a same side of the stator winding, so that a height of a welding end can be fully used. In the present disclosure, a problem that a plurality of coils of the stator winding are nested is further resolved, a height of bending parts of a stator coil can be reduced, motor efficiency can be improved, a torque density and a power density of the motor are improved, a circulating current of the stator winding can be avoided, a loss is reduced, and problems of insulation damage and high-voltage breakdown caused by nesting the coils in a production process can be reduced. In addition, an odd quantity of layers of windings are used to resolve a problem of allocating a quantity of conductors connected in series per phase, so that a motor with a specific power and torque requirement can be designed.

The above description is only some embodiments of the present disclosure and the explanation of the applied technical principles. It should be understood by a person skilled in the art that the scope involved in the present disclosure is not limited to the technical solutions formed by the specific combination of the above technical features, but should also cover other technical solutions formed by any combination of the above technical features or equivalent features thereof without departing from the inventive concept, such as the technical solutions formed by replacing the above features and (but not limited to) technical features having similar functions disclosed in the present disclosure with each other.

Technical features other than the technical features described in the specification are known to a person skilled in the art, and to highlight the innovative features of the present disclosure, the remaining technical features are not repeated herein.

What is claimed is:

1. A motor stator, comprising:
   a stator core having stator slots, each of the stator slots comprising slot layers; and
   a stator winding inserted into the stator slots, the stator winding comprising first conductors and second conductors,
   wherein each of the first conductors and the second conductors comprises two straight segment parts, the straight segment parts of the first conductors are separately located at two adjacent ones of the slot layers, and one of the straight segment parts of the second conductor and one of the straight segment parts of the first conductor are located in a same one of the stator slots; and
   wherein a pole pitch of the stator winding is $\tau$, a size of a pitch of each of the second conductors is y2, a distance between two adjacent ones of the first conductors at a same one of the slot layers is L1, a distance between two adjacent ones of the second conductors at a same one of the slot layers is L2, and the followings are met: $L1=\tau+1$ or $L1=\tau-1$, and $L2=2\tau-y2$.

2. The motor stator according to claim 1, wherein the stator winding further comprises:
   third conductors, located between the first conductors and the second conductors, wherein two straight segment parts of a third conductor and the two straight segment parts of a first conductor are separately located in a same stator slot, a size of a pitch of the third conductor is y3, and the following is met: $y3=y1$.

3. The motor stator according to claim 2, wherein the third conductor in corresponding stator slot occupies at least two slot layers.

4. The motor stator according to claim 1, wherein the stator winding comprises at least one phase winding.

5. The motor stator according to claim 4, wherein each phase winding comprises at least two branch windings, and the branch windings are connected in series or in parallel.

6. The motor stator according to claim 4, wherein each phase winding comprises two branch windings, and straight segment parts of the second conductors in the two branch windings are located in adjacent stator slots.

7. The motor stator according to claim 6, wherein straight segment parts of the first conductors in the two branch windings are located in adjacent stator slots.

8. The motor stator according to claim 1, wherein the first conductor further comprises:
   a head, the head being connected between one ends of the two straight segment parts of the first conductor; and
   bending part, the other ends of the two straight segment parts of the first conductor being separately connected to the bending parts.

9. The motor stator according to claim 8, wherein extension directions of bending parts of the first conductors located between adjacent second conductors are opposite, and extension directions of bending parts of the first conductors located outside the second conductors are the same.

10. A motor, comprising:
    a motor body; and
    a motor stator, mounted on the motor body, wherein the motor stator comprises:
      a stator core having stator slots, each of the stator slots comprising slot layers; and
      a stator winding inserted into the stator slots, the stator winding comprising first conductors and second conductors,
      wherein each of the first conductors and the second conductors comprises two straight segment parts, the straight segment parts of the first conductors are separately located at two adjacent ones of the slot layers, and one of the straight segment parts of the second conductor and one of the straight segment parts of the first conductor are located in a same one of the stator slots; and
      wherein a pole pitch of the stator winding is $\tau$, a size of a pitch of each of the second conductors is y2, a distance between two adjacent ones of the first conductors at a same one of the slot layers is L1, a distance between two adjacent ones of the second conductors at a same one of the slot layers is L2, and the followings are met: $L1=\tau+1$ or $L1=\tau-1$, and $L2=2\tau-y2$.

11. The motor according to claim 10, wherein the stator winding further comprises:
    third conductors, located between the first conductors and the second conductors, wherein two straight segment parts of a third conductor and the two straight segment parts of a first conductor are separately located in a same stator slot, a size of a pitch of the third conductor is y3, and the following is met: $y3=y1$.

12. The motor according to claim 11, wherein the third conductor in corresponding stator slot occupies at least two slot layers.

13. The motor according to claim 10, wherein the stator winding comprises at least one phase winding.

14. The motor according to claim 13, wherein each phase winding comprises at least two branch windings, and the branch windings are connected in series or in parallel.

15. The motor according to claim 13, wherein each phase winding comprises two branch windings, and straight segment parts of the second conductors in the two branch windings are located in adjacent stator slots.

16. The motor according to claim 15, wherein straight segment parts of the first conductors in the two branch windings are located in adjacent stator slots.

17. The motor according to claim 10, wherein the first conductor further comprises:

a head, the head being connected between one ends of the two straight segment parts of the first conductor; and bending part, the other ends of the two straight segment parts of the first conductor being separately connected to the bending parts.

18. The motor stator according to claim 17, wherein extension directions of bending parts of the first conductors located between adjacent second conductors are opposite, and extension directions of bending parts of the first conductors located outside the second conductors are the same.

19. A vehicle, comprising a motor, wherein the motor comprises:

a motor body; and a motor stator, mounted on the motor body, the motor stator comprising:

a stator core having stator slots, each of the stator slots comprising slot layers; and a stator winding inserted into the stator slots, the stator winding comprising first conductors and second conductors, wherein each of the first conductors and the second conductors comprises two straight segment parts, the straight segment parts of the first conductors are separately located at two adjacent ones of the slot layers, and one of the straight segment parts of the second conductor and one of the straight segment parts of the first conductor are located in a same one of the stator slots; and wherein a pole pitch of the stator winding is $\tau$, a size of a pitch of each of the second conductors is $y2$, a distance between two adjacent ones of the first conductors at a same one of the slot layers is $L1$, a distance between two adjacent ones of the second conductors at a same one of the slot layers is $L2$, and the followings are met: $L1=\tau+1$ or $L1=\tau-1$, and $L2=2\tau-y2$.

20. The vehicle according to claim 19, wherein the vehicle is an electric vehicle.

\* \* \* \* \*